United States Patent
Finestone et al.

(10) Patent No.: US 6,699,541 B2
(45) Date of Patent: *Mar. 2, 2004

(54) SELF-CLOSING ADHESIVE-FREE RESEALABLE PACKAGE

(76) Inventors: Arnold Finestone, 2400 Presidential Way, West Palm Beach, FL (US) 33401; Gilbert Bloch, 3349 St. Malo Ct., Palm Beach Gardens, FL (US) 33410

( * ) Notice: Subject to any disclaimer, the term of this patent is extended or adjusted under 35 U.S.C. 154(b) by 53 days.

This patent is subject to a terminal disclaimer.

(21) Appl. No.: 09/934,971

(22) Filed: Aug. 21, 2001

(65) Prior Publication Data

US 2002/0110684 A1 Aug. 15, 2002

Related U.S. Application Data

(63) Continuation-in-part of application No. 09/781,181, filed on Feb. 12, 2001.

(51) Int. Cl.[7] .................. B32B 29/00; B32B 3/00; B32B 23/08
(52) U.S. Cl. .................. 428/34.3; 428/40.1; 428/41.7; 428/187; 428/192; 428/195; 428/202; 428/334; 428/507; 428/511; 428/513
(58) Field of Search .................. 428/507, 511, 428/513, 40.1, 41.7, 34.3, 334, 187, 192, 195, 202; 53/450, 172, 449, 461, 547, 170

(56) References Cited

U.S. PATENT DOCUMENTS

| | | | |
|---|---|---|---|
| 3,151,803 A | 10/1964 | Kaminski | 229/80 |
| 4,317,030 A | 2/1982 | Berghell | 235/489 |
| 4,354,631 A | 10/1982 | Stevenson | 229/71 |
| 4,583,679 A | 4/1986 | Johnson | 229/123.1 |
| 4,680,918 A | 7/1987 | Lovell | 53/466 |
| 5,089,320 A | 2/1992 | Straus et al. | 428/216 |
| 5,244,702 A | 9/1993 | Finestone et al. | 428/34.3 |
| 5,271,553 A | 12/1993 | Kim | 229/303 |
| 5,499,757 A | 3/1996 | Back | 229/81 |
| 5,595,046 A | 1/1997 | Weder | 53/397 |
| 5,633,071 A * | 5/1997 | Murphy | 428/195 |
| 5,655,707 A | 8/1997 | Jensen | 229/160.2 |
| 5,704,481 A | 1/1998 | Lutz | 206/484 |
| 5,725,311 A | 3/1998 | Ponsi et al. | 383/66 |
| 5,780,150 A | 7/1998 | Bloch et al. | 428/350 |
| 5,928,749 A | 7/1999 | Forman | 428/43 |
| 5,962,099 A | 10/1999 | Bloch et al. | 428/41.4 |
| 5,983,594 A | 11/1999 | Forman | 53/133.4 |
| 5,993,962 A | 11/1999 | Timm et al. | 428/354 |
| 6,032,854 A | 3/2000 | Greer et al. | 229/301 |
| 6,076,969 A | 6/2000 | Jaisle et al. | 383/211 |
| 6,085,904 A | 7/2000 | Perdue, Jr. | 206/484 |
| 6,115,999 A | 9/2000 | Adelman | 53/465 |
| 6,133,173 A | 10/2000 | Riedel et al. | 442/400 |
| 6,135,506 A | 10/2000 | Chess et al. | 283/80 |
| 6,436,499 B1 | 8/2002 | Krampe et al. | 428/40.1 |
| 2003/0037511 A1 * | 2/2003 | Finestone et al. | 53/461 |
| 2003/0037512 A1 * | 2/2003 | Finestone et al. | 53/461 |

* cited by examiner

Primary Examiner—Monique R. Jackson
(74) Attorney, Agent, or Firm—Winston & Strawn LLP

(57) ABSTRACT

A self-closing resealable packaging material formed from at least one sheet of a package forming material, which encloses and seals and article therein. A cohesive material is applied to surface portions of the packaging material so that when wrapped around an article cohesive portions stick together and seal the package. To make the package resealable a liner is placed upon at least a part of the cohesive material containing surface so that a non-adhering margin is formed and the unused cohesive can be utilized reseal the package after its initial opening.

20 Claims, 2 Drawing Sheets

SELF-CLOSING ADHESIVE-FREE RESEALABLE PACKAGE

CROSS-REFERENCE TO RELATED APPLICATIONS

This application is a continuation-in-part of copending application Ser. No. 09/781,181 filed Feb. 12, 2001 still pending.

FIELD OF INVENTION

This invention relates to an adhesive-free resealable, reusable mailer package for shipping goods to a consumer, who may then re-use the same package for remailing the goods back to the sender.

BACKGROUND ART

An adhesive-free resealable, reusable mailer package is very desirable in this age of modern technology, where many sales occur over the Internet and e-commerce has created a new meaning for "mail-order" goods. The consumers' need for an easy and convenient way to repackage and re-mail unwanted merchandise back to the sender has always existed but now that need has increased significantly with the genesis of e-commerce. Additionally, the need for a reusable mailer package results in a need for a resealable reusable package that has a simple and inexpensive construction.

A re-mailable returnable envelope is disclosed in Kim U.S. Pat. No. 5,721,553. This envelope is not sufficient for sending nor returning goods and merchandise back to the sender through the postal system, but instead is designed for re-mailing correspondence. The envelope has inner and outer front panels each provided with a sealing flap that has adhesive areas. The recipient may reuse the envelope by removing the outer front panel to expose the inner front panel of the envelope.

Another resealable paper envelope is disclosed in Burns U.S. Pat. No. 4,690,322. This envelope is used to secure documents as needed in business applications. Rather than using paperclips or staples, the envelope secures the documents and is resealable. Such an envelope of paper construction is not intended, nor would it be sufficient to ship merchandise. Additionally, for opening and closing the envelope pressure sensitive contact adhesive is utilized.

A resealable multiple-use package of spunbonded olefin sheet material is disclosed in Greer et al. U.S. Pat. No. 6,032,854. It is known that there are significant drawbacks of utilizing spunbonded olefin sheet material in a re-mailable envelope used for shipping merchandise. One problem is that the olefin forms such a secure bond with hot melt adhesive that when the package is opened the olefin material is stretched and damaged. To overcome this problem, Greer discloses an olefin envelope that has a non-continuous adhesive strip with many openings so that the tear force required to open the package is reduced. An important aspect of any resealable package that is used for mailing merchandise, sometimes across country or even internationally, is that it will not re-open during transit. Thus, Greer's adhesive strip would not be sufficient for mailing merchandise through the postal system.

Timm et al. U.S. Pat. No. 5,993,962 discloses a resealable package that has a multiple reseal capability. The package includes a first substrate with a layer of pressure sensitive adhesive and another layer of cold seal adhesive applied over the layer of pressure sensitive adhesive. An additional layer of cold seal adhesive is applied to a second substrate. In use, the first substrate is wrapped around a product to be packaged and the two cold seal adhesive strips are aligned, pressed together and bonded. When the package is opened, the two substrates are pulled apart and the pressure sensitive adhesive is peeled off the substrate section, exposing the adhesive so that the package can be resealed using the exposed pressure sensitive adhesive. The drawback of this package is that it is critical to select appropriate adhesives for the proper functioning of the package. In other words, the adhesives chosen must be selected so that the bonds between the pressure sensitive adhesive and the cold seal adhesive, and the bonds between the cold seal adhesive and the substrate section, are stronger than the bond between the pressure sensitive adhesive and the substrate, otherwise, the pressure sensitive adhesive will not be cleanly pulled off the substrate upon pulling the substrates apart. Secondly, another drawback of this package is that if the substrate is not treated, some of the pressure sensitive adhesive will remain and will not be cleanly peeled off the substrate.

In this new millennium and age of the Internet, there is a large and growing amount of sales of merchandise over the Internet, e.g., e-commerce, in addition to the ordinary catalog sales and sales from fulfillment houses. These new types of transactions, in addition to the established ones, cause a tremendous increase in the mailing and shipping of goods, both locally and across the country. Inevitably, the increase in the sales and shipping of goods consequently causes an increase in returning those same goods to the shipper when the consumer is unsatisfied with the purchase. Therefore, a need exists for a convenient way to ship goods to consumers that can be easily returned to the shipper in the same package when necessary to do so. This need highlights a further need for a resealable package that has a simple and inexpensive construction. The present invention fulfills these needs by providing a durable, weather-resistant, adhesive-free resealable reusable package.

SUMMARY OF INVENTION

The present invention provides an adhesive-free, resealable, reusable mailer package, which offers a consumer a convenient way to return goods in the same package back to the sender and also offers a manufacturer a resealable package that has a simple and inexpensive construction.

The invention relates to a package-forming material for forming a package which encloses and seals an article therein. The package-forming material includes a packaging material in the form of at least one sheet having a surface that is receptive to receiving cohesive or adhesive materials; and a cohesive material applied to surface portions of the packaging material. To make a resealable package, a liner is provided upon at least part of a cohesive material containing surface portion adjacent to where the article is to be packaged to prevent that part of the surface portion from adhering to other cohesive material containing surface portions, thus forming a non-adhered margin adjacent the article after the package is formed. The packaging material is then placed about an article to be packaged such that surface portions of the packaging material that include the cohesive material contact other portions that include cohesive material to adhere such portions to each other and form a sealed package which encloses the article with the non-adhered margin adjacent the article. Preferably, the adhered cohesive portions surround the article to be packaged.

An indication of where the package can be opened can be included so that the indication enables the package to be opened in the non-adhered margin, such that the package may be resealed by removing the liner and contacting the cohesive material containing surface portions to adhere such portions to each other and form a re-sealed package. After opening the package along the indication and removing the article from the package, the article may be replaced in the package and the package is resealed by removing the liner and package contacting the cohesive material containing surface portions to adhere such portions together. The indication is preferably an indicia or a pre-printed dotted line which indicates where the package may be cut to open it. Also, the package-forming material can also include indicia to indicate where an edge or end of the article to be packaged should be placed so that it does not cover the liner. The liner is preferably paper, plastic, foil or a composite material.

The packaging material may be paper or plastic but advantageously is a laminate of paper and plastic. One preferred material is a thermoplastic material such as TYVEK®. Another preferred packaging material is a laminate that includes a water impermeable plastic film having a first corona discharge treated surface that is adhesively cold laminated to a first paper layer. Alternatively, the packaging material may be a laminate that includes a water impermeable plastic film having first and second corona discharge treated surfaces that are adhesively cold laminated to first and second paper layers.

The cohesive material is advantageously present upon first and second surface portions of the packaging material and the package is formed by placing the first surface of the packaging material above the article to be packaged and by placing the second surface portion of the packaging material below the article to be packaged, such that the first and second surface portions of the packaging material that include the cohesive material contact and adhere to each other to form the sealed package which encloses the article. The first and second surface portions of the packaging material may be provided on one side of a single sheet of the laminate which is then folded around the article to be packaged to place the cohesive material containing portions in face-to-face orientation so that they can be adhered together to form the package. For convenience, the cohesive material may be present upon one entire surface of the laminate sheet. Alternatively, the first and second surface portions may be provided as first and second laminate sheets which are placed above and below the article to be packaged with the cohesive material containing surface portions in face-to-face orientation so that they can be adhered together to form the package.

A number of different combinations can be utilized in the package-forming material of the invention. The paper layer of the laminate may include a printed surface, the printed surface is adhered to the plastic film, and the plastic film forms an outer portion of the package. Also, the paper layer can include first and second surfaces, with the first surface being a printed surface and the second surface being adhered to the plastic film so that the printed surface of the paper layer forms an outer portion of the package. Furthermore, the first surface of the paper layer may be metallized and the second surface adhered to the plastic film so that the metallized surface of the paper layer forms a decorative outer portion of the package.

BRIEF DESCRIPTION OF THE DRAWINGS

For a better understanding of the invention, reference is made to the detailed description of the invention an the accompanying drawings therein.

DESCRIPTION OF THE PREFERRED EMBODIMENTS

Figure 1:
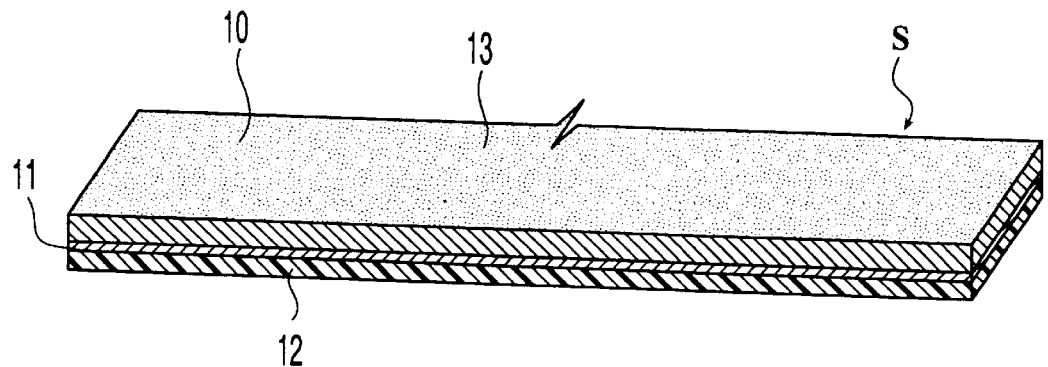
FIG. 1 illustrates a flexible, paper-plastic laminate in accordance with the invention.

The invention resides in a self-closing resealable packaging material formed from a package-forming material which encloses and seals an article therein, comprising: a packaging material in the form of at least one sheet having a surface that is receptive to receiving cohesive or adhesive materials, a cohesive material applied to surface portions of the packaging material, and a liner upon at least a part of the cohesive material containing surface portion adjacent to where an article is to be packaged to prevent that part of the surface portion from adhering to other cohesive material containing surface portions, thus forming a non-adhered margin adjacent to the article after the package is formed, wherein the packaging material is placed about an article to be packaged such that surface portions of the packaging material that include the cohesive material contact other portions that include cohesive material to adhere such portions to each other and form a sealed package which encloses the article with the non-adhered margin adjacent the article.

The package-forming material may be comprised of paper, plastic, laminate, which may be two-ply or three-ply, or olefin material such as Tyvek®.

In one embodiment the package-forming material is paper, which can be coated paper, Kraft paper, or higher quality paper such as Bond or white paper and has a thickness of from about 3 to 6 mils. The paper layer may be printable or metallized to obtain a decorative packaging material and the metallized paper layer may also be provided with graphics thereon.

In another embodiment the package-forming material is plastic, comprised of a polymer selected from the group consisting of polypropylene, polyethylene and polyester and has a thickness of from about 0.5 to about 3 mils. The plastic packaging material may be oriented or biaxially oriented to impart high-strength thereto. The surfaces of the plastic layer may be corona discharge treated to render it receptive to inks and printing. Further, if a decorative package is desired, the plastic may be metallized as by vacuum deposition.

In a further embodiment, the package forming-material is two-ply laminate, more specifically, a paper/plastic laminate, wherein a paper layer is laminated to a plastic film layer, and preferably the paper layer is cold laminated to the plastic layer.

The paper layer of the laminate may include coated paper, Kraft paper, or a higher quality paper such as Bond paper or white paper. The paper layer preferably comprises Kraft paper and has a thickness of from about 3 to about 6 mils. The plastic film layer of the laminate may be oriented to impart high strength thereto. A biaxial orientation is preferred for greatest strength. The plastic film layer preferably comprises a polymer selected from the group consisting of polypropylene, polyethylene and polyester and has a thickness of from at least about 0.5 to 3 mils.

The plastic film layer has a first corona-discharge treated surface. This treatment is applied to the plastic immediately before the first corona discharge treated surface is adhesively laminated to the paper layer. This enables a strong bond to be achieved between the plastic and paper to form a paper-plastic film laminate having first and second opposed outer surfaces.

The cold lamination process enables the present packaging material to be manufactured at much higher speeds than when other adhesives, such as hot melt adhesives, are utilized, for example due to the additional time required for cooling of the hot melt adhesive before a secure bond is achieved. If hot melt adhesives were used instead of cold lamination for joining the plastic film to the paper, the heat of the adhesive could cause the film to shrink, thus causing a loss of strength. Also, the hot melt adhesive does not achieve its final bond strength until the adhesive cools, and the plastic film can shrink before this happens. Moreover, a wrinkled or curled product often results due to the difference in the high strength and low strength areas of the plastic film.

The use of cold lamination is also advantageous when an oriented or biaxially-oriented plastic film is utilized. It is known that at elevated temperatures, such films relax and lose molecular orientation and strength. For example, when two sheets of biaxially-oriented polyester film are seamed together, using an ultrasonically-activated sealing bar to create internal friction and heat within the film, the films soften and fuse, with a resultant sealing line that is weak, such that the sheets then tend to tear along this line. Similar problems are encountered if an oriented film is exposed to high heat, such as if a hot melt adhesive would be used to join the film to the paper. Cold lamination utilizing a water-based adhesive is essential in order to produce a laminate that has high strength. Any of a wide range of water-based adhesives can be used, although a vinyl acetate ethylene copolymer is preferred. The paper layer absorbs the water from these adhesives so that a high strength lamination can be rapidly achieved. U.S. Pat. No. 5,244,702 provides further details on this cold lamination process, and is incorporated herein to the extent necessary to understand this feature of the invention.

Another benefit of the use of a water-based adhesive is that this type of adhesive does not require the use of volatile organic solvents. Thus, adverse health and environmental effects are avoided because such solvents are not used. Also, additional costs for recovering or disposing of solvents are not incurred.

Depending on the type of packaging material desired, the packaging material may further include an additional paper layer to form a paper-plastic-paper, three-ply laminate sheeting. The extra paper layer may be desirable for packaging objects with pointed edges or simply when a packaging material with more strength is desired. As the paper layers form the inner and outer sides of the packaging material, they can easily be printed with graphics or other indicia prior to application of the cohesive material. This enables the packaging material to have one appearance on the outside of the package and another, different appearance on the side of the material that faces the package.

A cohesive material, which has the property of only sticking to itself, is applied to surface portions of the packaging material. It may be desirable in some situations to coat less than the entire surface of the packaging material. Accordingly, a screen type roller or rotary screen printing device can be used to selectively apply the coating upon only specific areas of the laminate sheeting. In addition, a spray head or series of spray heads may be used to selectively deposit a particular or random pattern. The pattern can be arranged to achieve a desired cohesive adhesion of the overall laminate sheeting. Alternatively, the coating can be applied to the entire outer surface of the packaging material.

The type and amount of cohesive coating to be applied will vary depending upon the results desired. For example, when packaging articles of a standard size, the packager may desire packaging material that does not have a layer of cohesive material applied to one entire surface of the laminate sheeting. Instead, when the material is to be used for the wrapping of larger items or articles, it may be desirable that the packaging material has cohesive material coated only on the perimeter of the sheeting but not in the areas of the sheeting that would be covered by the item or article. Thus, less cohesive would be needed and the packaging material would be less costly and a more efficient use of cohesive would be provided.

A releasable liner is placed upon at least part of the cohesive material surface of the packaging material such that when the package is formed and sealed by the cohesively coated surfaces of the packaging coming in contact and forming cohesive—cohesive bonds, at least a portion of the cohesive material is inhibited from contacting other cohesive material due to the presence of the liner. Thus, a non-adhering section is formed during the initial sealing of the package. The non-adhering section forms a non-adhered margin adjacent to the packaged article after the package is formed. The liner may be composed of any material that does not adhere to cohesive material such as paper, silicone treated paper, a plastic film, a foil or a composite material.

The packaging material of the present invention is preferably stored on a roll and dispensed therefrom as needed. Since the cohesive material only sticks to itself and only one surface of the packaging material contains the cohesive, when the packaging material is rolled up, the coated surfaces do not make contact and no barriers are required to prevent the sheeting from sticking to itself while stored on the roll.

For applications, the packaging material can be used in automated wrapping equipment, wherein the resultant package is automatically wrapped by a machine generally known in the art, or alternatively the packaging material can be used in manual wrapping, wherein the packaging material is pulled off and cut from the roll, an article is placed on the surface of the packaging material and the packaging material is folded over and about the article.

In either method of wrapping an article, the opposing coated surfaces of the packaging material come into contact and form cohesive—cohesive bonds thereby enclosing the article with a non-adhering margin formed by the placement of a releaseable liner, so that the package may be resealed a second time after its initial opening by pulling off the liner and exposing the unused cohesive material.

Alternatively, instead of packaging an article with one unitary sheet of packaging material, it may be desirable to use two separate sheets of packaging material, wherein at least a portion of each sheet has a layer of cohesive material. The two sheets of packaging material are placed on top of each other such that the cohesively coated surfaces of each packaging material are opposing surfaces, the article is placed between the two sheets and the two sheets are placed in contact with each other so the contacted portions of the coated surfaces of the sheetings form cohesive—cohesive bonds and the article is enclosed within the packaging material, thereby forming a self-closing package. Additionally, the liner is placed between the two sheets of packaging material before sealing the article in the package so that a non-adhering margin is created so that the package may be resealed after its initial opening.

One feature of the present invention is that it is capable of packaging articles of various sizes and shapes. The packaging material simply is pulled off the roll in an amount that accommodates the particular size of the particular article to be packaged.

In all embodiments, the exterior surface of the package may include a printable surface and such printable exterior surface may include a printed dotted line along the edge positioned so that the package may be opened by cutting along the dotted line.

In addition, if desired a decorative package is provided in an embodiment wherein the exterior surface of the packaging material is metallized or aluminized. If a silver finish is desired, an aluminized surface is preferred. Other metallizing treatments, e.g., with copper, iron, or alloys, can be used when other colors are desired.

It may also be desirable that the packaging material have printable surfaces so that logos, messages, advertisements, emblems, trademarks or simply, addressee information etc., may be printed on the exterior or interior surfaces of the formed package. In this regard, the paper layer includes a printable surface. Further, the plastic may include a second corona discharge treated surface to render it receptive to inks so that it may exhibit graphics that may be desired.

As noted herein, a single ply material is often suitable for many packaging applications. In these situations, the material may be a heavy weight paper, such as kraft paper or the like, a plastic film, such as MYLAR or TYVEK, or a treated paper such as aluminized paper. The outer surface of the material should be able to be provided with indicia or other printed information. If the material itself is not receptive to such printed information, it should be treated to be receptive. For example, a plastic film of polyethylene that has the outer surface treated by a corona discharge can then be printed or provided with printed indicia. It is also possible, although less preferred, that the indicia be applied to the packaging material by an adhesive-backed sticker, label or the like.

For protection of the printed indicia, it is advantageous to utilize a paper/plastic laminate where the surface of the paper ply that includes the printed information is cold laminated to a clear plastic film, so that the indicia is visible through the film but protected by it. When a three ply paper/plastic/paper laminate is used, the outer paper layer can easily be printed using any one of a variety of well known techniques, including silk screening and the like. The inner plastic film provides moisture resistance to the article or item that is wrapped by the packaging material.

The Laminate Sheeting

Referring to FIG. 1, shown therein is a unitary, flexible paper-plastic laminate sheeting of the present invention. The two-ply laminate sheeting includes a paper facing ply 10 whose gauge, weight and quality are appropriate for the self-closing, resealable package and a plastic film ply (12). The paper ply (10) is cold laminated by an adhesive layer (11) to a plastic film ply (12), such as polypropylene or polyester (MYLAR). The inner surface of the plastic ply is rendered wettable by a corona-discharge treatment to enhance the energy at this surface so that it is receptive to adhesives. The plastic film ply (12) is no greater than 3 mils in thickness and is at least 0.5 to 1 mil in thickness. The paper base ply (10) is thicker, preferably being 2 to 3 mils thick.

The plastic film is preferably biaxially-oriented, and has exceptional tensile strength. Such orientation is effected by stretching the film along both its transverse and horizontal axes to molecularly orient the film structure.

Cold lamination of the plies is effected by a water-based adhesive, preferably a water-based vinyl acetate ethylene copolymer composition having an affinity both for the paper ply and the film ply. No heat is applied to the oriented film as the plastic film ply is laminated to the paper ply. The water-based adhesive is fluid at ambient temperature and once cured, is not water-soluble and is not remoistenable.

The paper ply of the laminate includes coated paper, Kraft paper, Bond paper or white paper and has a printable exterior. The plastic film ply includes a biaxially oriented film. The plastic film layer comprises: polypropylene, polyethylene, and polyester. The water impermeable plastic layer may have a first corona discharge treated surface making it more receptive to the cohesive material. In addition, the plastic film layer may have a second corona discharge treatment so that its surface is receptive to inks or other graphic materials. Further, the plastic ply or the paper ply may be metallized or aluminized so that a decorative package may be provided.

Figure 2:
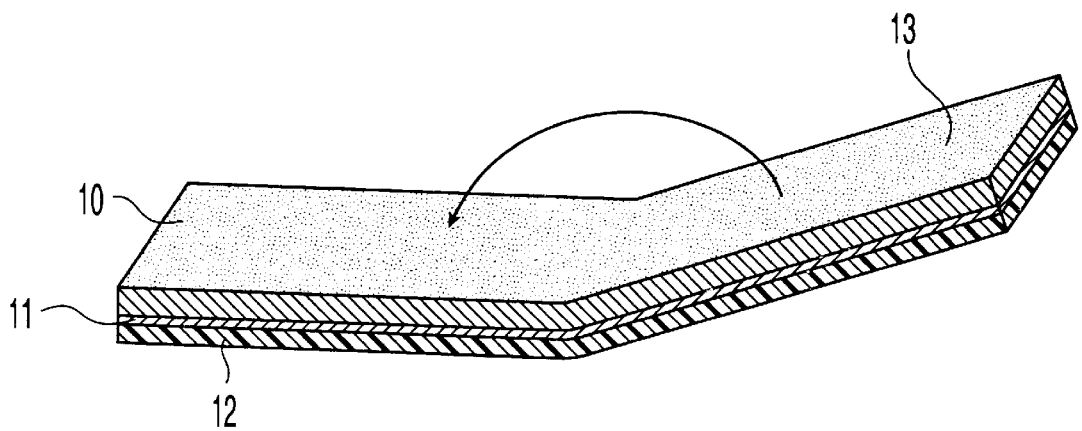
FIG. 2 illustrates the flexible, paper-plastic laminate being folded over so that opposing surfaces with cohesive material face each other.

Referring to FIG. 2, the unitary sheeting of laminate may be folded over so that the cohesive material comes in contact so that cohesive bonds are formed between the cohesively coated surface of the laminate (13).

Figure 3:
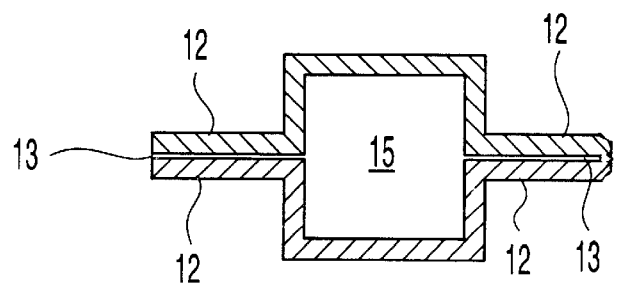
FIG. 3 illustrates a box enclosed inside the resealable package formed from the laminate of the present invention.

Referring to FIG. 3, the laminate sheeting of the invention is folded over and encloses a box (15) thereby creating a self closing resealable package.

Figure 4:
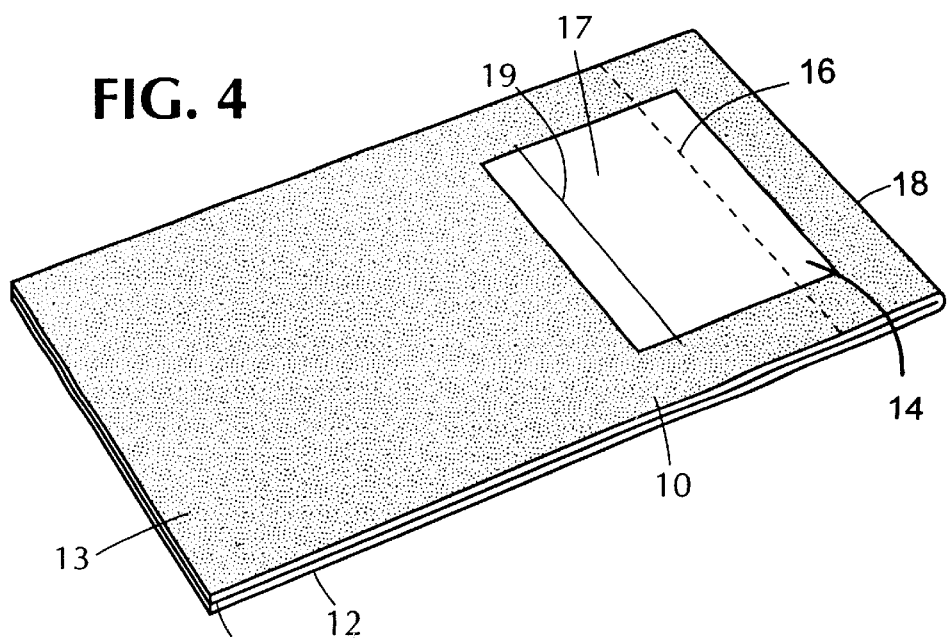
FIG. 4 illustrates the cohesively coated packaging material with releasable liner and indicia for marking where article to be packaged should be placed and where to cut package for opening.

Referring to FIG. 4, the resealable package of the invention is shown with enclosed merchandise (12) and indicia (16) in the form or a pre-printed dotted line positioned so that when cut along the pre-dotted line (16), the edge of the laminate with the cohesive material (18) is cut away from the package and the non-adhered margin (14) is left unimpaired and intact so that the recipient may reseal the package after its initial opening.

Figure 6:
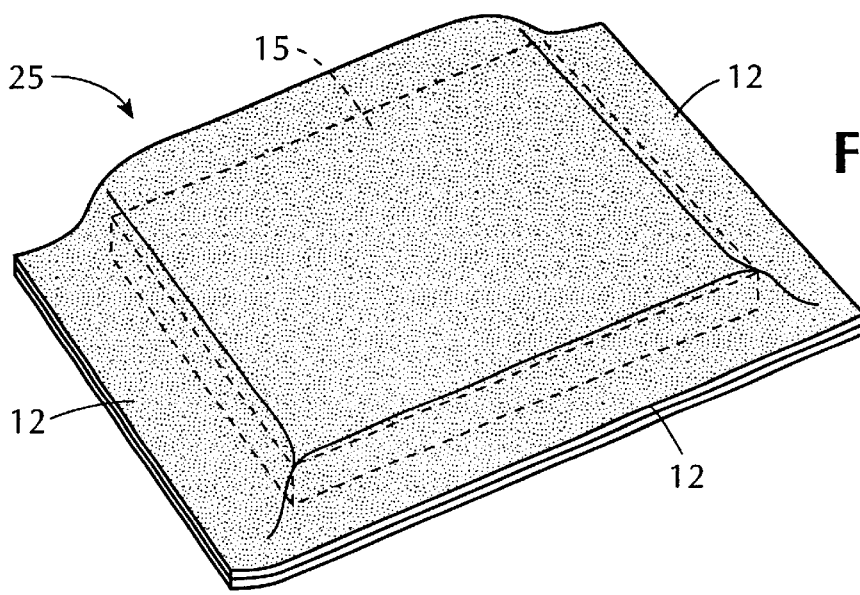
FIG. 6 illustrates the packaging material of the present invention being folded over so that opposing cohesively coated panels are created.
Figure 5:
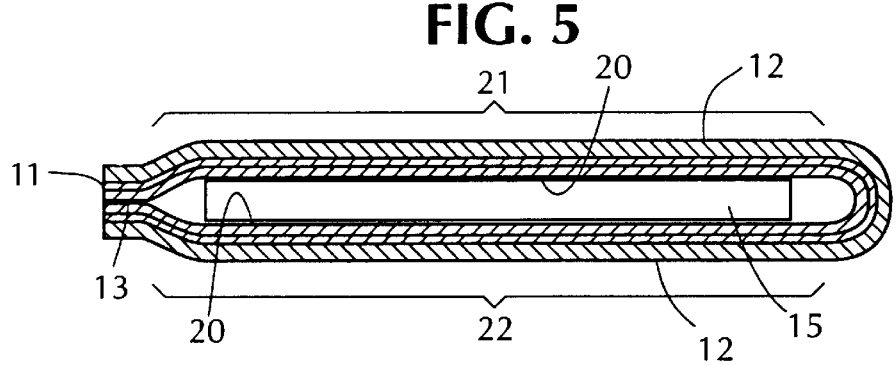
FIG. 5 illustrates an adhesive free resealable package with enclosed merchandise and pre-printed dotted line indicia for cutting package open.

Referring to FIG. 5, the laminate is folded over so that first and second opposing substrate panels (21) and (22) are formed having an inner surfaces (20) that are coated with the cohesive material (13). The folding of the laminate sheeting defines an internal space for an enclosed article (15). When the two opposing substrate panels are aligned and in contact, cohesive—cohesive bonds form between the first and second opposing substrate panels thereby sealing the package. FIG. 6 shows the packaged article (25) ready for mailing.

Referring again to FIG. 4, the packaging material of the invention has a release liner (19), which covers a portion of the cohesive material so that when the package is formed there is a non-adhering margin (14) that is adjacent the article to be packaged. The non-adhering margin (14) may be utilized later to reseal the same package by pulling off the liner (19) after the package is initially opened by cutting along line (18) to expose the unused portion of cohesive material.

Suitable materials for the liner include paper, MYLAR or aluminized paper. The liner can be a blank or unprinted sheet of the desired material, or it can be provided as a decorative portion of the package. In either situation, the liner should be readily visible so that a user can locate it for removal when the package is to be re-sealed and re-used.

In another embodiment, the liner may be provided with advertising information, a coupon, a game piece or puzzle, a rebate form or another benefit to the recipient of the package. Thus, the liner may be removed from the package and retained by the recipient even if the package is not to be re-sealed and re-used.

Utilization of the Self-Closing Adhesive Free Resealable Packaging Material

A shipper of goods may package merchandise using the packaging material of the present invention by placing goods to be shipped on the cohesively coated substrate material. The cohesive material does not stick to the goods because cohesive material only sticks to itself. Thus, when the substrate sheeting is folded over the goods or alternatively when first and second substrate panels are aligned and placed in contact so that the cohesive material on the opposing panel or second panel come into contact, cohesive—cohesive bonds are formed which initially seal the package.

The releasable liner covers a portion of the cohesively coated laminate such that no cohesive—cohesive bonds are formed at that portion of the laminate because the liner prevents the cohesively coated opposing panels from direct contact when the laminate is folded over an item or box to be packaged.

When a recipient receives the goods in the mail, the package may be opened by cutting along a pre-printed dotted line so that the recipient may have access to the items enclosed in the package. If the recipient desires to return and remail the goods in the same package, the goods may be replaced into the same package and the package may be resealed by removing the release liner thereby allowing contact of portion of the cohesively coated substrate panels that was initially inhibited by the liner.

Although the invention has been described by way of numerous specific embodiments, it is recognized that skilled artisans will appreciate and devise various modifications, and it is intended that the appended claims cover all modifications and variations that fall within the true spirit and scope of the following claims.

What is claimed is:

1. A package-forming material for forming a package which encloses and seals an article therein, comprising: a packaging material in the form of at least one sheet having a surface that is receptive to receiving cohesive or adhesive materials; a cohesive material applied to all or a portion of the surface of the packaging material; and a removable, non-adhered liner located upon at least part of a cohesive material containing surface portion adjacent to where the article is to be packaged to prevent that part of the surface portion from adhering to other cohesive material containing surface portions, thus forming a non-adhered margin adjacent the article after the package is formed; wherein the packaging material can be placed about an article to be packaged such that surface portions of the packaging material that include the cohesive material can contact other portions that include cohesive material to adhere such portions to each other and form a sealed package which encloses the article with the non-adhered margin adjacent the article such that the package can be opened and the liner removed to expose cohesive material containing surface portions that can be adhered together to close or re-seal the package.

2. The package-forming material of claim 1, wherein the packaging material is paper, plastic or a laminate of paper and plastic, and the adhered cohesive portions can be provided to surround the article to be packaged.

3. The package-forming material of claim 1, wherein the cohesive material is present upon first and second surface portions of the packaging material so that the package can be formed by placing the first surface of the packaging material above the article to be packaged and by placing the second surface portion of the packaging material below the article to be packaged, such that the first and second surface portions of the packaging material that include the cohesive material can contact and adhere to each other to form the sealed package.

4. The package-forming material of claim 3, wherein the first and second surface portions of the packaging material are provided on one side of the sheet so that the sheet can be folded around the article to be packaged to place the cohesive material containing portions in face-to-face orientation so that they can be adhered together to form the package.

5. The package-forming material of claim 4, wherein the cohesive material is present upon one entire surface of the sheet.

6. The package-forming material of claim 3, wherein the first and second surface portions are provided as first and second sheets so that they can be placed above and below the article to be packaged with the cohesive material containing surface portions in face-to-face orientation so that they can be adhered together to form the package.

7. The package-forming material of claim 1, wherein the packaging material is a thermoplastic film.

8. A package-forming material for forming a package which encloses and seals an article therein, comprising: a packaging material in the form of at least one sheet of a laminate that includes a water impermeable plastic film having a first corona discharge treated surface that is adhesively cold laminated to a first paper layer, and having a surface that is receptive to receiving cohesive or adhesive materials; a cohesive material applied to all or a portion of the surface of the packaging material; and a removable liner located upon at least part of a cohesive material containing surface portion adjacent to where the article is to be packaged to prevent that part of the surface portion from adhering to other cohesive material containing surface portions, thus forming a non-adhered margin adjacent the article after the package is formed; wherein the packaging material can be placed about an article to be packaged such that surface portions of the packaging material that include the cohesive material can contact other portions that include cohesive material to adhere such portions to each other and form a sealed package which encloses the article with the non-adhered margin adjacent the article such that the package can be opened and the liner removed to expose cohesive material containing surface portions that can be adhered together to close or re-seal the package.

9. The package-forming material of claim 8, wherein the packaging material is a laminate that includes a water impermeable plastic film having first and second corona discharge treated surfaces that are adhesively cold laminated to first and second paper layers.

10. The package-forming material of claim 8, wherein the plastic film is laminated to the paper layer with an adhesive that includes a water-based acrylic copolymer composition or a vinyl acetate ethylene copolymer, and wherein the paper layer is coated paper, Kraft paper, Bond paper or white paper having a thickness of about 3 to 6 mils and the plastic film comprises polypropylene, polyethylene or polyester and has a thickness of about 1 to 3 mils.

11. The package-forming material of claim 10, wherein the paper layer of the laminate includes a printed surface, the printed surface is adhered to the plastic film, and the plastic film forms an outer portion of the packaging material.

12. The package-forming material of claim 8, wherein the paper layer includes first and second surfaces, the first surface is a printed surface, the second surface is adhered to the plastic film and the printed surface of the paper layer forms an outer portion of the packaging material.

13. The package-forming material of claim 8, wherein the paper layer includes first and second surfaces, the first surface is a metallized surface, the second surface is adhered to the plastic film and the metallized surface of the paper layer forms a decorative outer portion of the packaging material.

14. A package formed from a package-forming material comprising: a packaging material in the form of at least one sheet having a surface that is receptive to receiving cohesive or adhesive materials; a cohesive material applied to all or a portion of the surface of the packaging material; and a removable liner located upon at least part of a cohesive material containing surface portion adjacent to where the article is to be packaged to prevent that part of the surface potion from adhering to other cohesive material containing surface portions, thus forming a non-adhered margin adjacent the article after the package is formed; wherein the packaging material is placed about an article to be packaged such that surface portions of the packaging material that include the cohesive material contact other portions that include cohesive material to adhere such portions to each other and form a sealed package which encloses the article with the non-adhered margin adjacent the article such that the package can be opened and the liner removed to expose cohesive material containing surface portions that can be adhered together to close or re-seal the package.

15. The package of claim 14, wherein the packaging material includes an indication of where the package can be opened wherein the indication enables the package to be opened in the non-adhered margin, such that the package may be resealed by removing the liner and contacting the cohesive material containing surface portions to adhere such portions to each other and form a re-sealed package.

16. The package of claim 15, wherein, after opening the package along the indication and removing the article from the package, the article may be replaced in the package and the package is resealed by removing the liner and package contacting the cohesive material containing surface portions to adhere such portions together.

17. The package of claim 15, wherein the indication is an indicia or a pre-printed dotted line which indicates where the package may be cut to open it.

18. The package of claim 15, further comprising indicia to indicate where an edge or end of the article to be packaged should be placed.

19. The package of claim 15, wherein the liner is paper, plastic, foil or a composite material.

20. The package of claim 15, wherein the packaging material is paper, a thermoplastic film or a laminate of paper and a plastic film.

* * * * *